United States Patent [19]
Hitch et al.

[11] Patent Number: 5,861,842
[45] Date of Patent: Jan. 19, 1999

[54] SPACECRAFT DISCIPLINED REFERENCE OSCILLATOR

[75] Inventors: Benjamin F. Hitch, San Jose; Kenneth Gilliland, Mountain View, both of Calif.

[73] Assignee: Space Systems/Loral, Inc., Palo Alto, Calif.

[21] Appl. No.: 920,739

[22] Filed: Aug. 29, 1997

[51] Int. Cl.⁶ .............................. G01S 5/02; H04B 7/185
[52] U.S. Cl. .................... 342/357; 342/352; 701/213; 455/13.2
[58] Field of Search ................................... 342/352, 357; 701/213; 455/12.1, 13.2

[56] References Cited

U.S. PATENT DOCUMENTS

| | | | |
|---|---|---|---|
| 5,003,553 | 3/1991 | Schluge et al. | 375/1 |
| 5,440,313 | 8/1995 | Osterdock et al. | 342/352 |
| 5,440,491 | 8/1995 | Kawano et al. | 364/443 |
| 5,619,212 | 4/1997 | Counselman, III | 342/357 |
| 5,629,649 | 5/1997 | Ujiie | 331/17 |
| 5,663,715 | 9/1997 | Godoroia | 340/825.2 |
| 5,717,403 | 2/1998 | Nelson et al. | 342/357 |

*Primary Examiner*—Thomas Tarcza
*Assistant Examiner*—Dao L. Phan
*Attorney, Agent, or Firm*—Perman & Green, LLP

[57] ABSTRACT

An earth orbit satellite control system which provides automatic, continuous correction of phase and frequency in order to maintain synchronization between the satellite and a Global Positioning System (GPS). The system achieves phase and frequency synchronization by disciplining the satellite's reference oscillator by phase locking it to timing pulses received from the GPS. The system comprising a state machine controller which cycles the disciplined oscillator into both a closed-loop operation wherein the oscillator is phase-locked to the GPS timing pulses, and an open-loop operation wherein a previously stored GPS timing pulse, or commands from a ground station, drive oscillator phase and frequency synchronization.

29 Claims, 11 Drawing Sheets

| PIN | SIGNAL NAME | DEFINITION |
|---|---|---|
| 4A | PPS A IN | TIMING INPUT FROM FIRST GPS RECEIVER |
| 4B | PPS B IN | TIMING INPUT FROM SECOND GPS RECEIVER |
| 4C | 19.38 MHz CLK IN | INPUT FROM OCXO |
| 4D | 32 x K1 | 5 BIT LOOP CONSTANT (INTEGRATOR PATH) |
| 4E | 8 x K2 | 5 BIT LOOP CONSTANT (DIRECT PATH) |
| 4G | PPS SELECT A | COMMAND INPUT TO SELECT PPS A |
| 4H | PPS SELECT B | COMMAND INPUT TO SELECT PPS B |
| 4I | CLOSE/OPEN-LOOP COMMAND | COMMAND INPUT TO SELECT CLOSED-LOOP OR OPEN-LOOP MODE |
| 4J | OCXO UP | PULSE COMMAND TO INCREMENT OCXO FREQUENCY |
| 4K | OCXO DOWN | PULSE COMMAND TO DECREMENT OCXO FREQUENCY |
| 4Q | RESET | SETS ASIC TO A KNOWN STATE AT POWER ON |

FIG.2B

| PIN | SIGNAL NAME | DEFINITION |
|---|---|---|
| 4F | D/A CONTROL WORD | 12 BIT INPUTTED TO D/A CONVERTER WHICH DEFINES THE CONTROL VOLTAGE |
| 4L | CLOSE/OPEN-LOOP TLMY | INDICATES ASIC MODE OF OPERATION |
| 4M | LOCK TLMY | INDICATES LOCK PHASE ERROR WITHIN +/-40 FOR 960 SECONDS |
| 4N | ALARM TLMY | INDICATES AN OVERRANGE CONDITION IN THE PHASE DETECTOR |
| 4O | REF PPS OUT | A RE-CLOCKED VERSION OF WHICHEVER REFERENCE 1 PPS INPUT FROM THE GPS IS SELECTED |
| 4P | PLL PPS OUT | THE INTERNAL REFERENCE 1 PPS SIGNAL |

FIG.2C

SPACECRAFT DISCIPLINED REFERENCE OSCILLATOR

FIELD OF THE INVENTION

This invention relates to earth orbit satellite control, specifically to methods and apparatus for synchronizing earth orbit satellites to a Global Positioning System (GPS).

BACKGROUND OF THE INVENTION

A highly reliable timing and frequency reference is essential for wireless communication systems that use either digital or analog technologies. Synchronization to a standard timing and frequency reference is particularly important when the communication system employs multiple digital or analog components. Earth orbit satellite networks are examples of these type of communication systems.

Time and frequency synchronization of a terrestrial receiver to a GPS satellite system is known, as is evidenced by, for example, Absolute Time Corporation's Model 100A/B GPS Clock; Datum, Incorporated's Model bc627AT GPS Satellite Receiver; Hewlett-Packard's Models HP 58000A and HP 58503A; and TrueTime's Model GPS-705 Receiver. In these conventional systems, the terrestrial receiver accomplishes time and frequency synchronization by locking itself to signals from the GPS. This locking feature is implemented by disciplining the receiver's reference oscillator to input time and frequency signals received from the GPS. The synchronization can be remotely monitored for accuracy. If an inaccurate condition is detected, time and/or frequency correction is allowed. However, the correction techniques require intervention by ground commands.

Currently, earth orbit satellite networks do not employ this technique of time and frequency synchronization using a GPS system. Thus, there is a need for a system which maintains the synchronization between a satellite's time and/or frequency and that of the GPS system.

OBJECTS AND ADVANTAGES OF THE INVENTION

It is a first object and advantage of this invention to provide automatic, continuous correction of time and frequency in order to maintain synchronization between a satellite and a Global Positioning System (GPS).

It is another object and advantage of this invention to achieve time and frequency synchronization by disciplining a satellite's reference oscillator by phase locking it to timing pulses from the GPS.

It is another object and advantage of this invention to provide a disciplined oscillator which can be cycled into both a closed-loop operating mode, wherein the oscillator is phase locked to the GPS timing pulses, and an open-loop operating mode, wherein a previously stored GPS timing pulse, or a command from a ground station, drives the oscillator time and frequency synchronization.

It is another object and advantage of this invention to provide an intelligent phase-locked loop (PLL) function, by means of a state machine, which is autonomous of ground control except in rare conditions. These PLL functions include, for example: performing validation/calibration of the GPS reference signal prior to starting an acquisition; presetting circuit values based on initial phase measurements to minimize acquisition time; performing continuous activity and event detection of anomalous conditions; freezing/holding the PLL in the Open-loop mode when anomalies occur; performing automatic reacquisition when required; performing telemetry monitoring functions; and enabling remote adjustment of OCXO frequency by ground control.

SUMMARY OF THE INVENTION

The foregoing and other problems are overcome and the objects of the invention are realized by methods and apparatus in accordance with embodiments of this invention. More particularly, this invention is directed to automatic, continuous correction of a satellite's time and frequency to maintain synchronization to a GPS satellite system.

According to the teachings of this invention, a satellite achieves long term performance comparable to that obtained from a highly accurate atomic frequency reference with increased stability by synchronizing itself to the GPS system. The satellite achieves time and frequency synchronization to the GPS by disciplining, or locking, its reference oscillator to timing pulses received from the GPS.

In the preferred embodiment of the present invention, the satellite's reference oscillator is an Oven Controlled Crystal Oscillator (OCXO). The OCXO is disciplined to the GPS system by phase locking the oscillator to timing pulses received from the GPS system. The OCXO is phase locked to the GPS timing pulses by means of a second-order digital phase-locked loop. The phase-locked loop automatically and continuously corrects the frequency and phase of the OCXO in response to the changing GPS pulses, or to a received ground command.

In the present invention, digital circuitry necessary to implement this phase-locked loop (PLL) is contained within the satellite's local oscillator and is referred to as a Phase-Locked Loop Application Specific Integrated Circuit (PLL ASIC). The PLL ASIC interfaces with a receiver that receives timing pulses from the GPS, an On-Board Processor (OBPE), and other circuitry within the local oscillator for D/A conversion and signal conditioning. The PLL has an integrator zero, which allows adjustment of a loop damping factor as well as a loop bandwidth. The loop damping factor and loop bandwidth may be adjusted during initial test and alignment to reduce the acquisition time, to minimize the transient overshoot in the phase error during acquisition, and to reduce the OCXO final output phase and frequency error.

The PLL ASIC functions in two modes, a closed-loop mode and an open-loop mode. In the closed-loop mode, the PLL ASIC operates by comparing the phase of a reference, one pulse per second (PPS) signal from the GPS system, hereinafter simply a GPS reference signal, to a similar internal one PPS signal derived from the OCXO. A phase difference is determined from the comparison of the GPS reference signal and the internal one PPS signal derived from the OCXO. The phase difference, referred to as a phase error, is recorded by the PLL ASIC in the form of a digital word. The digital word is digitally filtered by the PLL ASIC to form a control word. The control word is passed by the PLL ASIC to a D/A converter. The D/A converter converts the control word into an analog control voltage. The analog control voltage corrects the frequency and phase of the OCXO to values which approach the GPS' long term frequency and phase. In the closed-loop mode the correction is applied continuously. In effect, the PLL ASIC uses the control word to reduce the phase error, i.e. the difference in phase between the GPS reference signal and the internal one PPS signal derived from the OCXO. As the phase error approaches zero, synchronization between the satellite and the GPS system improves.

The PLL ASIC enters the open-loop mode when the GPS reference signal is missing or erratic, or by command from a ground station, such as when the ground station determines that the GPS reference signals are not sufficiently accurate. If the GPS reference signal is missing or erratic, then the frequency of the OCXO is maintained by the PLL ASIC by using the control word which was defined and stored by the PLL ASIC the last time a valid GPS reference signal was received. Thus, the PLL ASIC holds the OCXO phase to the GPS reference phase that is based on a previously received GPS reference signal. The stored information holds the OCXO correction until another valid GPS reference signal is received.

If a ground station determines that the received GPS reference signals should not be used, for whatever reason, the ground station can force the PLL ASIC into the open-loop mode. If the open-loop mode is commanded, then the frequency of the OCXO is controlled by commands received from the ground station. That is, the ground originated commands directly increment or decrement the control word that the PLL ASIC passes to the D/A converter. In effect, the ground commands increment or decrement the control voltage and thus the OCXO's frequency. The ground commands, which can be inputted to the ground station either manually or automatically, override the phase differential synchronization process used in the closed-loop mode.

The operating modes of the PLL ASIC are maintained by a controller implemented as a state machine. The state machine monitors system inputs and outputs to automatically control entry into either the open-loop or the closed-loop mode. System inputs that can provoke a state machine response include commands received from the ground station, missing or erratic GPS reference signals, and abnormal events such as single-event-upsets (SEU's). Thus, the state machine, by controlling the operating modes of the PLL ASIC, first, provides automatic, continuous correction of the OCXO's time and frequency in order to maintain synchronization between the satellite and the GPS; second, prevents anomalous events from perturbing the correct OCXO setting; and third, provides status and alarm indication to the ground station.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2B and 2C are tables, in accordance with the present invention, of the inputs to and the outputs of the GPS Tracking Network Controller ASIC;

DETAILED DESCRIPTION OF THE INVENTION

Figure 1:
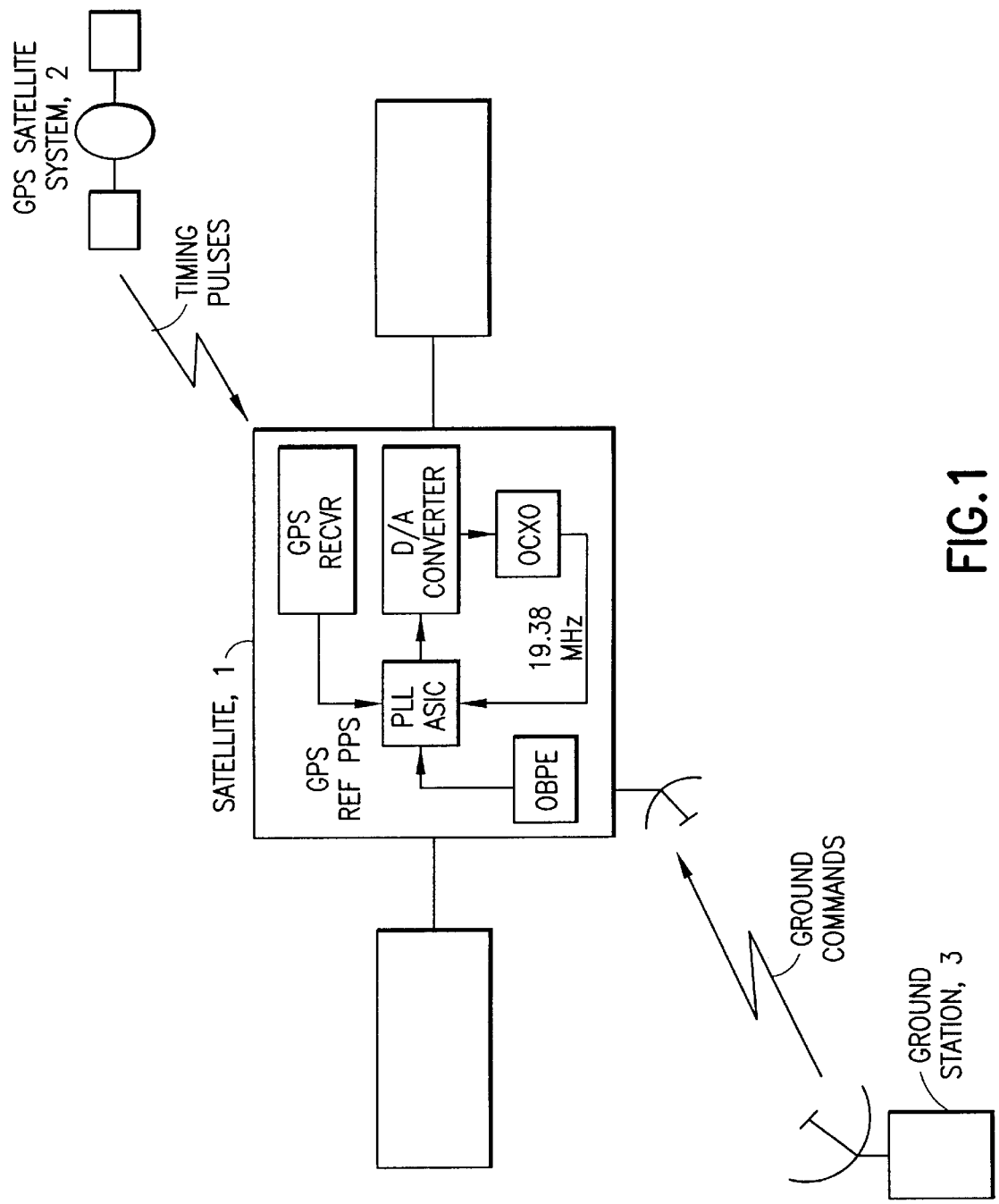
FIG. 1 is a block diagram, in accordance with the present invention, of a synchronization system for a satellite.

In accordance with the invention, and referring to FIG. 1, a satellite 1 achieves long term performance comparable to that obtained from a highly accurate atomic frequency reference with increased stability by synchronizing itself to the Global Positioning System (GPS) 2. In this invention, the satellite 1 synchronizes to the GPS 2 by disciplining or synchronizing its reference oscillator to timing pulses received from the GPS 2.

Figure 2A:
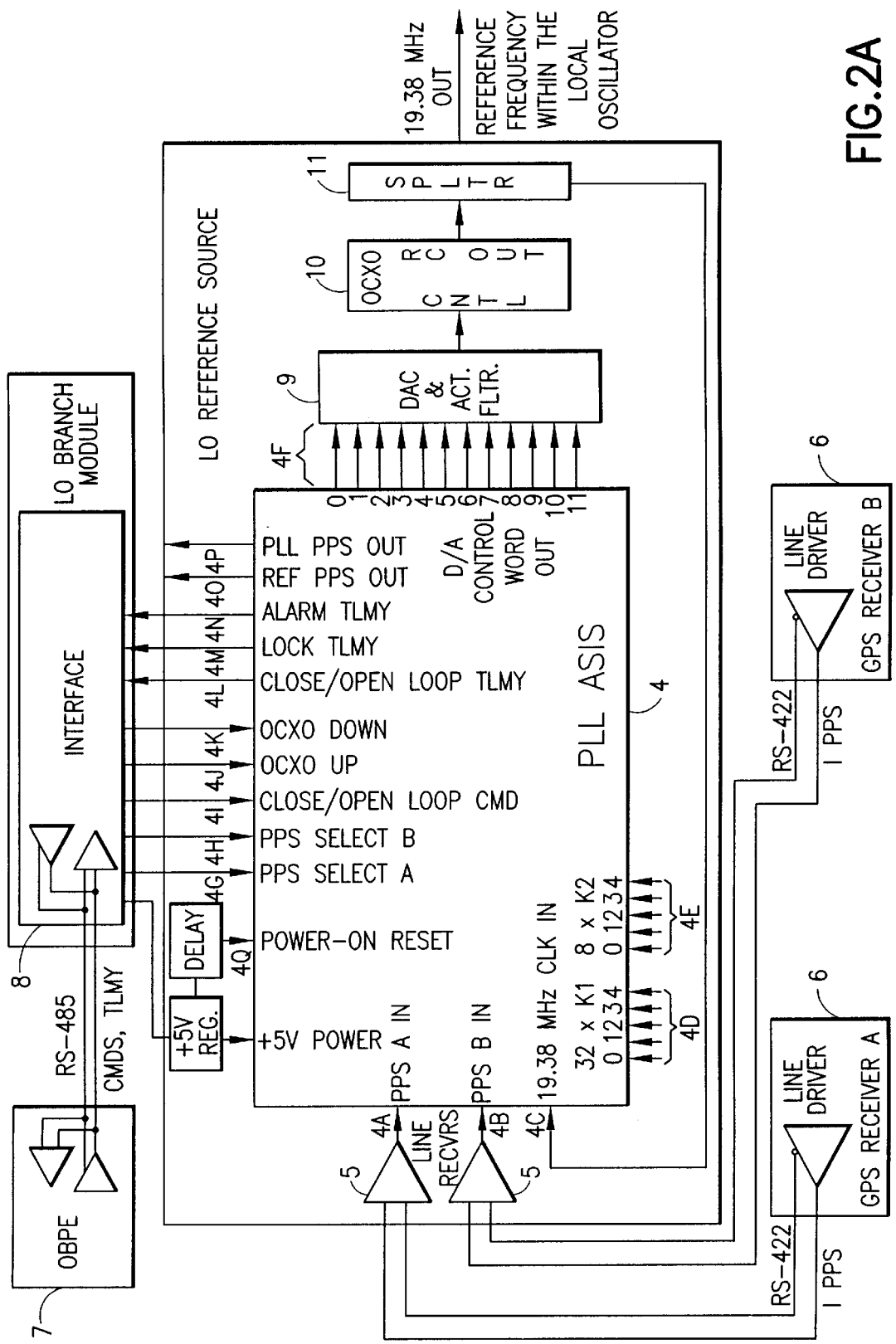
FIG. 2A is a block diagram, in accordance with the invention, for a GPS Tracking Network Controller ASIC and its interfaces.

In accordance with the present invention, and referring to FIG. 2A, the disciplining of the satellite's reference oscillator is implemented by phase locking the reference oscillator, an Oven Controlled Crystal Oscillator (OCXO) 10, to timing pulses received from the GPS 2. In this invention, the phase locking is achieved with a second-order digital phase-locked loop implemented as a Phase-Locked Loop Application Specific Integrated Circuit (PLL ASIC) 4. In the preferred embodiment, Rad-Hard PLL ASIC design provides reliable satellite operation. In FIG. 2A, the PLL ASIC 4 is shown interfacing with digital circuitry needed to support time and frequency synchronization between the satellite 1 and the GPS 2. FIGS. 2B and 2C illustrate the inputs to and the outputs of the PLL ASIC 4. In other embodiments the ASIC may be replaced by discrete circuits.

In the preferred embodiment, receivers 6 located at the satellite 1 receive timing signals from the GPS 2. The receivers 6 pass the timing signals from the GPS 2 to the PLL ASIC 4 via line receivers 5 located in the local oscillator. In this embodiment, the receivers 6 actually receive two GPS reference signals for redundancy purposes. This redundancy allows switching between GPS reference signals in the event of a receiver 6 or a line receiver 5 failure. The PLL ASIC 4 accepts the two GPS reference signals from the line receivers 5 at a PPS A IN signal, input 4A, and at a PPS B IN signal, input 4B. An On-Board Processor (OBPE) 7 informs the PLL ASIC 4, via an interface 8, which of the two GPS reference signals to select. This notification from the OBPE 7 is accepted by the PLL ASIC 4 at a PPS SELECT A signal, input 4G, and a PPS SELECT B signal, input 4H. Additionally, if neither GPS reference signal is valid, then the OBPE 7 informs the PLL ASIC 4 of that condition. The OBPE 7 is instructed by commands from a ground station which of the two GPS reference signals to select.

The PLL ASIC 4 receives another input which the PLL ASIC 4 uses to derive an internal one PPS signal. The PLL ASIC 4 accepts the input, a 19.38 MHz clock, from the OCXO 10 at a 19.38 MHz CLK IN signal, input 4C.

The PLL ASIC 4 functions in two modes, a closed-loop mode and an open-loop mode. In the closed-loop mode, the PLL ASIC 4 compares the phase of one of the two GPS reference signals, hereinafter simply a selected GPS reference signal, to the phase of the internal one PPS signal derived from the OCXO 10. The derivation of the internal one PPS signal, explained in detail below, begins when the PLL ASIC 4 accepts the 19.38 MHz clock at the 19.38 MHz CLK IN signal, input 4C, from the OCXO 10. The 19.38 MHz clock is actually passed to the PLL ASIC 4 by a splitter 11. The splitter 11 directs the 19.38 MHz clock to the PLL ASIC 4 and to various dielectric resonator oscillators in the local oscillator. The dielectric resonator oscillators use the 19.38 MHz clock as a reference frequency.

In the closed-loop mode, a phase difference is determined from the comparison of the selected GPS reference signal and the internal one PPS signal derived from the OCXO 10. The phase difference is recorded by the PLL ASIC 4 in the form of a digital word. The PLL ASIC 4 digitally filters the digital word to provide a control word. The PLL ASIC 4 passes this control word to a D/A Converter (DAC) 9 via outputs collectively referred to as a D/A CONTROL WORD, output 4F. The DAC 9 converts the control word to an analog control voltage which corrects the frequency and phase of the OCXO 10. In the closed-loop mode the correction is applied continuously. In effect, the PLL ASIC 4 uses the control word to reduce the phase error, that is, the difference in phase between the selected GPS reference signal and the internal one PPS signal. As the phase error approaches zero, synchronization between the satellite 1 and the GPS satellite system 2 improves.

The PLL ASIC 4 enters the open-loop mode when the selected GPS reference signal is missing or erratic, when an anomaly such as a single event upset occurs, or by command from the ground station 3, such as when the ground station 3 determines that the GPS reference signal being used is not sufficiently accurate. If the selected GPS reference signal is missing or erratic, or if a single event upset occurs, then the PLL ASIC 4 enters the open-loop mode and maintains the frequency of the OCXO 10 by using the control word which was calculated and stored by the PLL ASIC 4 the last time a valid GPS reference signal was received. Thus, the PLL ASIC 4 holds the OCXO frequency constant by inhibiting updates to the loop calculations. The stored information controls the OCXO 10 correction until another valid GPS reference signal is received. Once the valid GPS reference signal is again received, the PLL ASIC 4 reenters the closed-loop mode of operation.

If the ground station 3 determines that the GPS reference signals should not be used, for whatever reason, the ground station 3 can force the PLL ASIC 4 into the open-loop mode of operation. The open-loop command is received from the ground station by the OBPE 7 and passed to the PLL ASIC 4, via the interface 8. The PLL ASIC 4 receives the open-loop command at a CLOSED/OPEN-LOOP COMMAND, input 4I. If the open-loop mode is commanded, then the frequency of the OCXO 10 is controlled by commands received from the ground station 3. That is, the ground originated commands directly increment or decrement the control word that the PLL ASIC 4 passes to the DAC 9. The ground commands are received by the OBPE 7 and passed to the PLL ASIC 4 by the interface 8. The PLL ASIC 4 receives the increment or decrement command as either an OCXO UP signal, input 4J, or an OCXO DOWN signal, input 4K. In effect, the ground commands increment or decrement the control voltage, and thus the OCXO's frequency. The ground commands, which can be either manually or automatically inputted to the ground station 3, override the PLL ASIC's phase differential synchronization process used in the closed-loop mode of operation. It should be noted that the current operating mode of the PLL ASIC 4 can be referenced by evaluating a closed/open-loop telemetry signal (CLOSED/OPEN-LOOP TLMY) at PLL ASIC 4 output 4L.

Figure 3A:
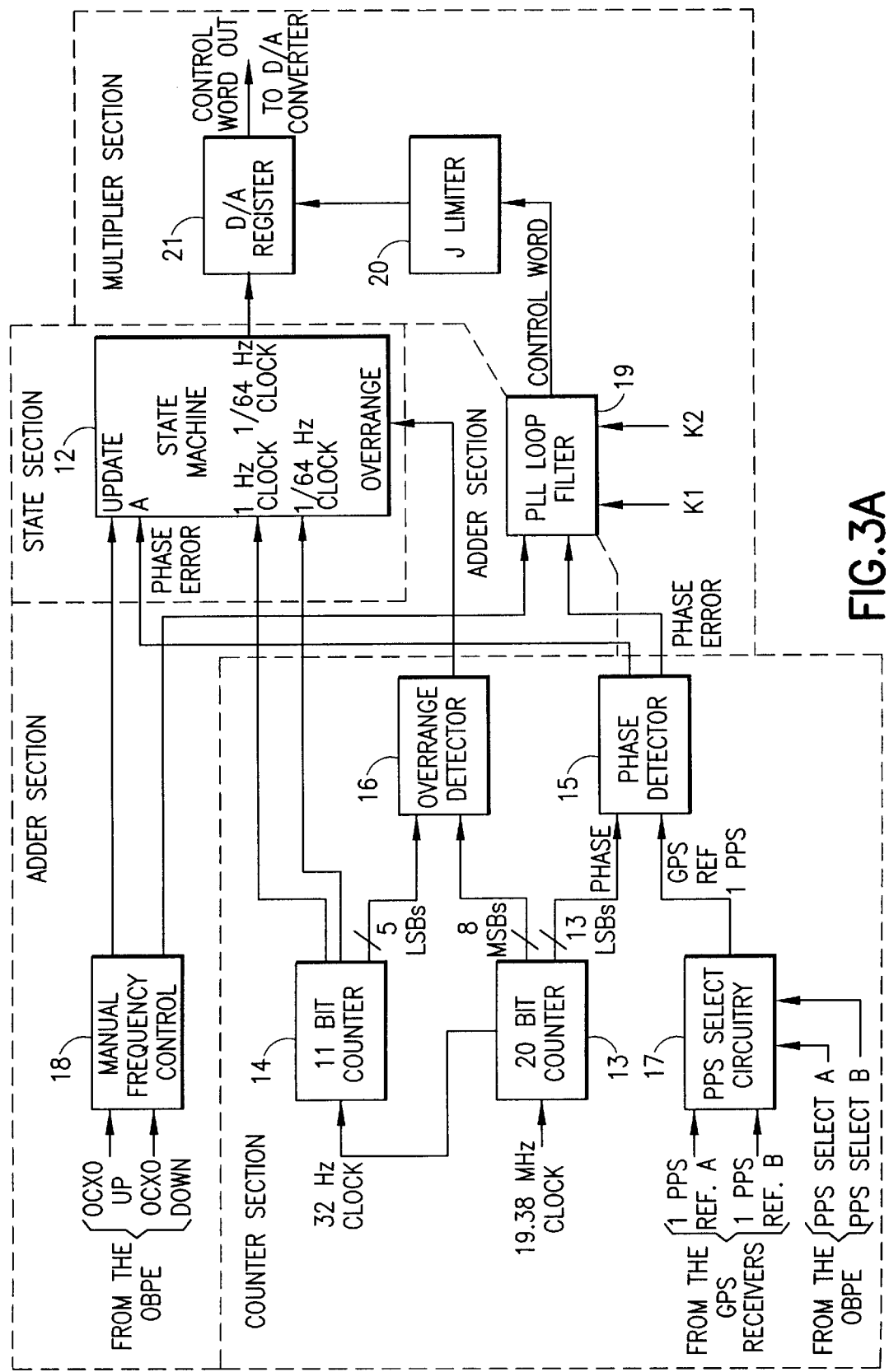
FIGS. 3A, 3B and 3C are block diagrams, according to the invention, for a PLL ASIC.
Figure 3B:
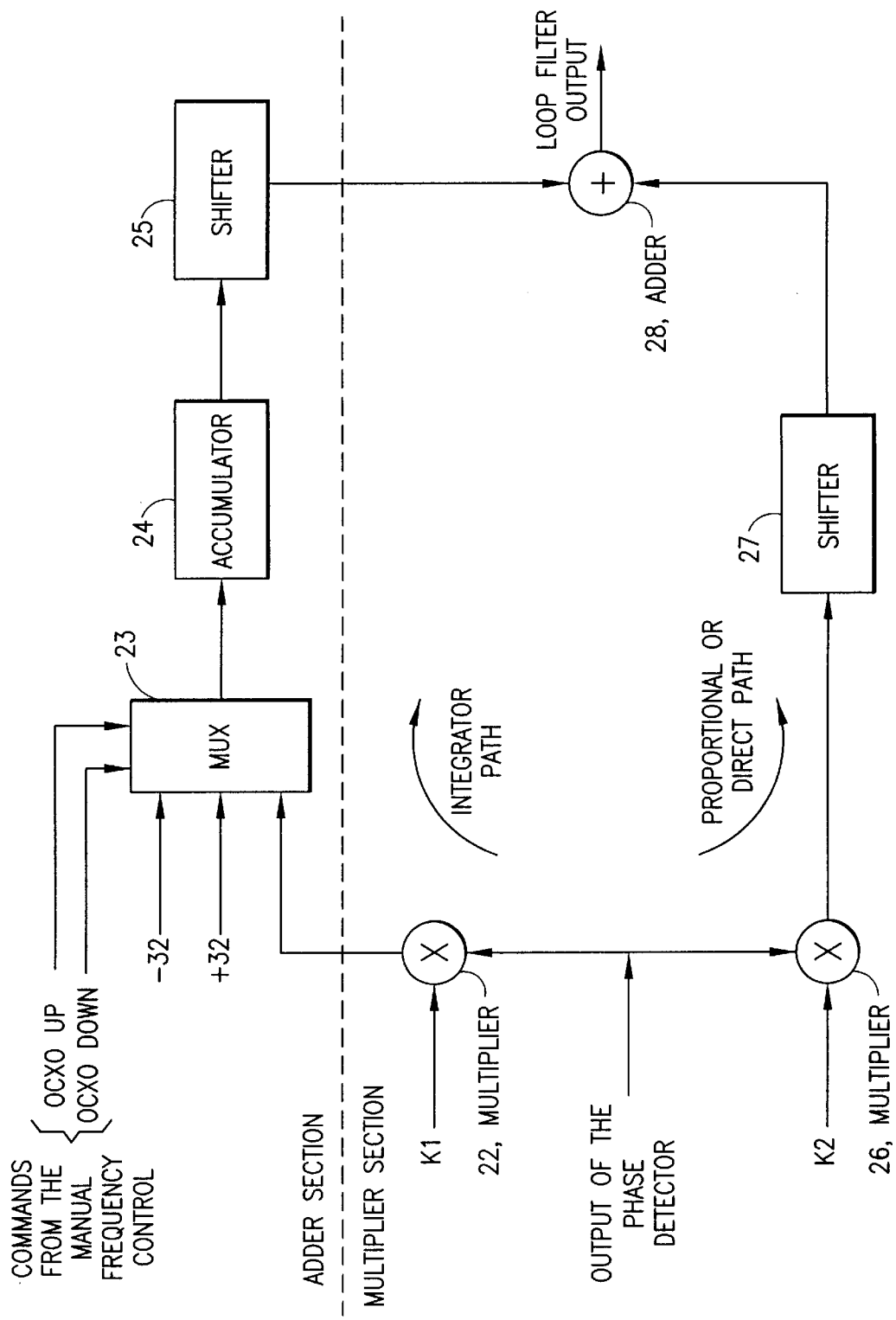
Figure 3C:
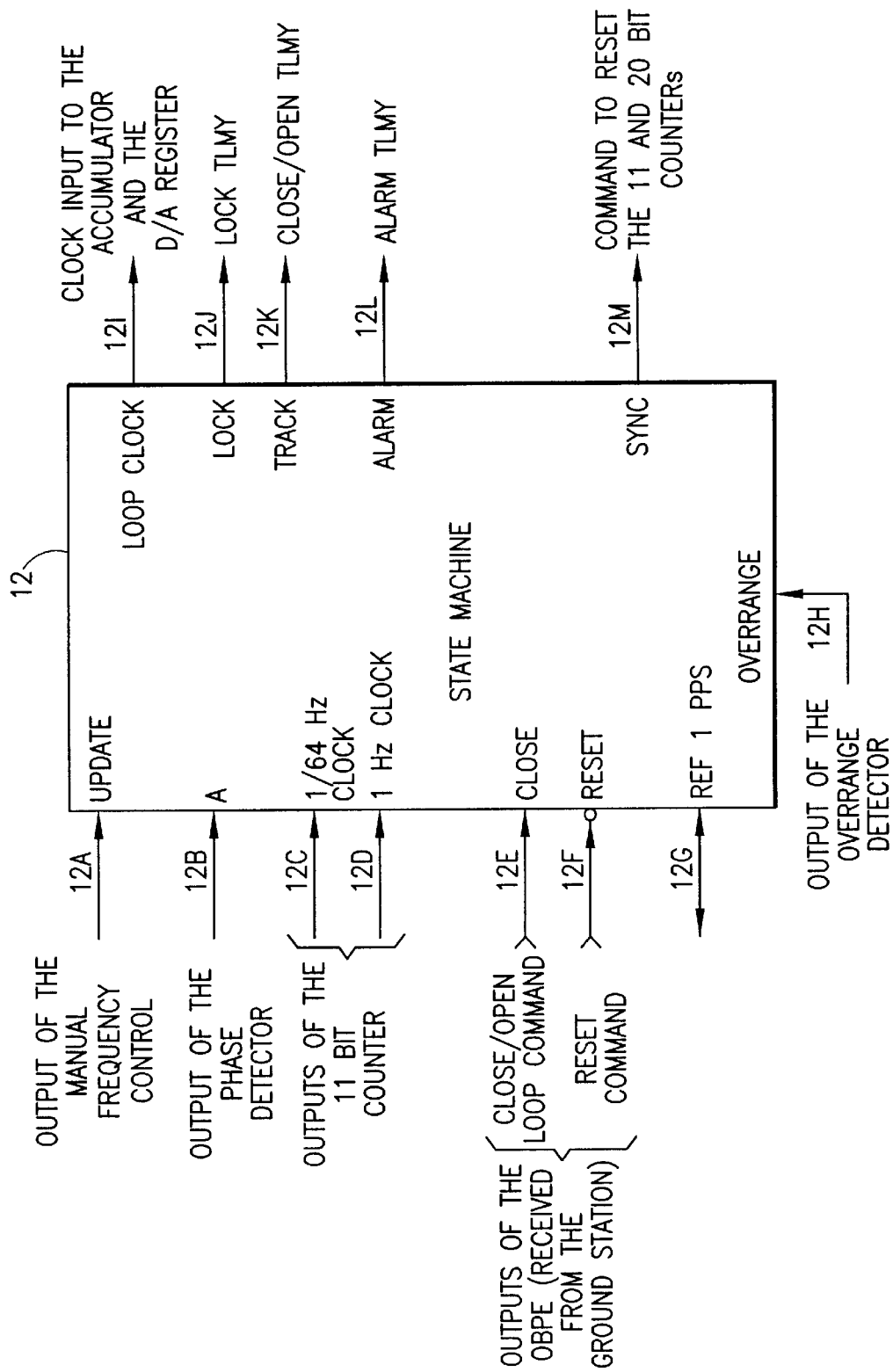

FIGS. 3A, 3B, and 3C show block diagrams which represent the components of the PLL ASIC 4. In the preferred embodiment, shown in FIG. 3A, the PLL ASIC's 4 configuration comprises four sections; a Counter section, an Adder section, a Multiplier section, and a State section.

In the preferred embodiment, the Counter section contains a synchronous 20 bit down counter 13, a synchronous 11 bit counter 14, a phase detector 15, an overrange detector 16, and PPS select circuitry 17. The 20 bit down counter 13 provides a running count of the phase, or time between the last internal one PPS signal which is derived from the OCXO 10 and the selected GPS reference signal. In effect, the 20 bit down counter 13 performs the derivation of the internal one PPS signal by accepting the 19.38 MHz clock from the splitter 11, and counting this clock down. The internal phase error word is defined as the thirteen least significant bits (13 LSBs) of the 20 bit down counter's output. The 13 LSBs are passed to the phase detector 15 for comparison to the selected GPS reference signal. Additionally, the upper 8 most significant bits (MSBs) of the 20 bit down counter 13 are passed to the overrange detector 16.

The 11 bit counter 14 accepts as input a 32 Hz clock from the 20 bit down counter 13. The 11 bit counter 14 outputs a 1 Hz internal clock and a $\frac{1}{64}$ Hz internal clock. The clocks are accepted at a 1 Hz Clock input 12D and $\frac{1}{64}$ Hz Clock input 12C of the state machine 12. Also, to ensure proper ASIC operation, the 1 Hz clock is available as a PLL PPS OUT signal, PLL ASIC's 4 output 4P. The PLL PPS OUT signal is used to determine if a valid internal one PPS signal is being derived from the OCXO 10. The state machine 12 uses the $\frac{1}{64}$ Hz clock, or loop clock output 12I, to update a D/A register 21. The D/A register 21 feeds the D/A CONTROL WORD OUT, outputs 4F, from the PLL ASIC 4 to a D/A converter 9. Updating the D/A register 21 with the $\frac{1}{64}$ Hz clock results in OCXO frequency updates every 64 seconds.

The phase detector 15 includes a register A which accepts as input the 13 LSBs of the 20 bit down counter 13, i.e. the rotating phase value of the internal one PPS signal, and the selected GPS reference signal. Once per second, the selected GPS reference signal latches the instantaneous phase value from the 20 bit down counter 13 into register A. The latching occurs on the rising edge of the selected GPS reference signal. A phase detector word is a measure of the difference in phase between the internal one PPS signal and the selected GPS reference signal. This phase difference is referred to as a phase error. The phase error value is zero when the selected GPS reference signal and the internal one PPS signal are within one count of the 20 bit down counter 13 counts. When the phase error is a value other than zero, the value is proportional to the phase difference between the selected GPS reference signal and the internal one PPS signal derived from the OCXO 10. The phase detector word is passed to a PLL loop filter 19, which resides in the Adder and Multiplier sections, and the state machine 12 as an A signal, input 12B.

The Counter section also contains an overrange detector 16. The overrange detector 16 accepts as inputs the output of the 20 bit down counter 13 and the 11 bit counter 14, these outputs being collectively referred to as a N-word counter value. The N-word counter bits are latched into an overrange register by the same GPS reference signal that latches the phase error into register A. Overrange logic detects phase errors that exceed the maximum phase error magnitude that can be latched into register A, that is phase errors, for example, outside the range −4096 to +4095 counts. If the maximum allowable phase error limit is exceeded, then the overrange detector 16 notifies the state machine 12 to activate an overrange alarm. The notification is passed to the state machine 12 as an OVERRANGE signal, input 12H. The alarm is also illustrated at the PLL ASIC 4 as an alarm telemetry signal (ALARM TLMY), output 4N. The alarm signal indicates that either an excessively large phase error, or an anomaly such as a single-event-upset (SEU), has occurred. The alarm signal causes the state machine 12 to take action in order to rectify the overrange condition. The state machine's 12 remedial action, detailed below, provides graceful degradation from the abnormality. In the presently preferred embodiment of this invention, the state machine 12 enables the PLL ASIC 4 to recover from the abnormality within one hour.

In the preferred embodiment, the Counter section also contains PPS select circuitry 17. The select circuit 17 uses inputs received from the OBPE 7, that is, the PPS SELECT A signal, input 4G, and the PPS SELECT B signal, input 4H, to determine which of the two GPS reference signals should be selected. The two GPS reference signals are the PPS A IN signal, input 4A, and the PPS B IN signal, input 4B. Once selected, the appropriate GPS reference signal is passed to the phase detector 15 for comparison to the internal one PPS signal, i.e. the 13 LSBs from the 20 bit down counter 13.

In the preferred embodiment, the Adder section contains a manual frequency control circuit 18 and a PLL loop filter 19. The manual frequency control circuit 18 accepts as input the CLOSED/OPEN-LOOP command, the OCXO UP signal, and the OCXO DOWN signal, the PLL ASIC 4 inputs 4I, 4J, and 4K, respectively. As discussed above, these inputs are received from the ground station 3 by the OBPE 7 and passed to the PLL ASIC 4 via the interface 8. The manual frequency control circuit 18 evaluates the ground commands and signals and determines how the PLL ASIC should proceed. When operating in the closed-loop mode, the manual frequency control circuit 18 sends the output of the phase detector 15, that is, the phase detector word, to the PLL loop filter 19. Thus, in the closed-loop mode the ground commands and signals do not impact the OCXO's 10 frequency. In effect, OCXO 10 stabilization is driven by the selected GPS reference signal. However, when the manual frequency control circuit 18 is commanded by the ground station 3 to order the PLL ASIC 4 to enter the open-loop mode, either the OCXO UP or the OCXO DOWN signal drives OCXO 10 stabilization. For example, when the PLL ASIC 4 is operating in the open-loop mode and the OCXO UP signal is received, the PLL loop filter 19 and state machine 12 cooperate to increment the D/A register's 21 word by one. Incrementing the value stored in the D/A register 21 results in incrementing, by one bit, the frequency of the OCXO 10. Likewise, when the PLL ASIC 4 is operating in the open-loop mode and the OCXO DOWN signal is received, the PLL loop filter 19 and state machine 12 update the D/A register's 21 word, and thus the OCXO's 10 frequency, by decrementing each value by one.

In the preferred embodiment, the PLL loop filter 19 comprises two paths, a proportional or direct path, and an integrator path. These paths are shown in detail in FIG. 3B. Each path includes an input coefficient and supporting digital circuitry which filter the digital word received from the phase detector 15. The input coefficients and supporting digital circuits allow for a predominant loop pole and a loop zero, and thus enable the independent setting of both a loop bandwidth and a damping factor. At initial test, the input coefficients are selected to yield the loop bandwidth and the damping factor which minimize the output phase and frequency error. By cycling the loop bandwidth and the damping factor the output of the PLL loop filter 19, a control word, can be varied.

As shown in FIG. 3B, the integrator path includes a K1 coefficient, a multiplier 22, a multiplexer 23, an accumulator 24, and a shifter 25. The shifter 25 acts as an arithmetic divider. The direct path includes a K2 coefficient, a multiplier 26, and a shifter 27. As in the integrator path, the direct path's shifter 27 acts as an arithmetic divider. Preferably, the coefficients K1 and K2 (PLL ASIC 4 inputs 4D and 4E) are defined at manufacture and hard coded for the life of the PLL ASIC 4, although it is within the scope of this invention to make these programmable, either from the OBPE 7 or from the ground station 3, via the OBPE 7. The values of the coefficients determine the response of the PLL loop, e.g. K1 may be defined to determine the loop bandwidth, while the ratio K2/K1 may then be defined to determine the damping factor, thus providing the requisite signal filtering.

The output of the PLL loop filter 19, the control word, is the result of summing the output of the integrator path and the direct path by means of an adder 28. When the PLL ASIC 4 is operating in the closed-loop mode the multiplexer 23 passes the output of the phase detector 15 through the integrator path, i.e. to the accumulator 24. In the preferred embodiment, the accumulator 24 has a limiter function that ensures the accumulator 24 does not overflow or underflow. Preferably, the limiter function is implemented to hold the accumulator at its maximum or minimum values. Thus, the acquisition time is significantly shortened, for the accumulator is prevented from storing excessively large values, which would take some time for a typical control loop operation to remove, i.e. integrate out.

The output of the accumulator 24 passes to the shifter 25. The shifter 25, after modifying the inputted signal, passes it onto the adder 28. When the PLL ASIC 4 is operating in the open-loop mode, however, the multiplexer 23 passes either a +32 or a −32 signal through the integrator path. Thus, in the open-loop mode the output of the phase detector 15 is not passed. For example, the multiplexer 23 passes the +32 signal if it receives the OCXO UP signal from the manual frequency control 18. By passing the +32 signal through the integrator path, the D/A register 21 is incremented by one upon the issuing of a loop clock pulse by the state machine 12. Similarly, if the multiplexer 23 receives the OCXO DOWN signal from the manual frequency control 18, it passes the −32 signal through the integrator path. The −32 signal results in the D/A register 21 being decremented by one upon the issuing of the loop clock pulse by the state machine 12. Referring again to FIG. 3A, the control word output of the PLL loop filter 19 is passed to a J limiter 20 in the Multiplier section.

In accordance with the present invention, the Multiplier section contains the J limiter 20 and the D/A register 21. The J limiter 20 receives the control word, the output of the PLL loop filter 19. The control word is passed through the J limiter 20 to the D/A register 21. The J limiter 20 limits the peak amplitude of the control word to a value between a specified minimum and maximum, and thus prevent overflow at the D/A register 21. Once received, the D/A register 21 passes the control word to the DAC 9 external to the PLL ASIC 4. The DAC 9 converts the control word to an analog control voltage that varies the OCXO's 10 frequency.

In the preferred embodiment of this invention, the operating modes of the PLL ASIC 4 are maintained by a controller implemented as the state machine 12. The state machine 12, shown in detail in FIG. 3C, resides in the State section of the PLL ASIC 4. In the preferred embodiment, reliable satellite operation is provided with triple-redundant state machine control. As discussed above, the state machine 12 responds to inputs and conditions including commands received from the ground station 3, missing or erratic GPS reference signals, and abnormal events such as single-event-upsets (SEU's). FIGS. 2B, 2C, and 3C illustrate the inputs to and outputs of the PLL ASIC 4 and its controller, the state machine 12.

Specifically, the state machine 12 accepts the following inputs; an UPDATE command, at input 12A, from the manual frequency control 18 which notifies the state machine 12 that the OCXO UP or the OCXO DOWN signal has been received from the ground station 3; the A signal, at input 12B, from the phase detector 15 which represents the phase error measured between the internal one PPS signal derived from the OCXO 10 and the selected GPS reference signal; the 1/64 Hz clock and the 1 Hz clock, at inputs 12C and 12D, from the 11 bit counter 14; a CLOSE command, at input 12E, which is the CLOSED/OPEN-LOOP command from the OBPE 7 that triggers the state machine 12 to enter the requested operating mode; a RESET command, at input 12F, activated at power-on which triggers the state machine to reset all registers within the PLL ASIC 4; a REF 1 PPS signal, at input 12G, from the PPS select circuitry 17 which enables the state machine 12 to monitor the selected GPS reference signal to ensure it is of sufficient accuracy; and the OVERRANGE signal, at input 12H, from the overrange detector 16 which notifies the state machine 12 that a large phase error has been detected, indicating that an abnormality such as a SEU or a missing or erratic PPS has occurred.

By evaluating these inputs, the state machine 12 automatically controls entry into either the open-loop or the closed-loop mode, and thus dictates when the OCXO's 10 frequency is updated. The state machine 12 also provides outputs which control other parts of the PLL ASIC 4. Specifically, these output include: a LOOP CLOCK signal at output 12I, which is the 1/64 Hz clock that is used to regulate when the D/A register 21, and hence the OCXO 10, is updated; and a SYNC signal at output 12M, which resets the 20 bit down counter 13 and the 11 bit counter 14 to their initial states. Additionally, the state machine 12 provides telemetry outputs which communicate the status of the GPS tracking network. Specifically, these outputs are: a lock telemetry signal (LOCK TLMY), at output 12J, which indicates that the OCXO 10 is locked to the inputted GPS timing signal; a TRACK or CLOSED/OPEN-LOOP TLMY signal, at output 12K, which indicates that the PLL ASIC 4 is in either the open-loop (low value) or the closed-loop (high value) operation; the ALARM TLMY signal, at output 12L, which indicates that the state machine 12 has received an alarm condition from the overrange detector 16, i.e. notifying the state machine 12 that a large phase error was detected.

As discussed above, PLL ASIC 4 operation was described in terms of two operating modes, the closed-loop and the open-loop mode. In addition to these high-level PLL ASIC 4 modes, the state machine 12 operates according to the modes illustrated in FIGS. 4A and 4B.

According to the embodiments of this invention, and referring to FIGS. 2A, 3A, 3C, 4A and 4B, the state machine 12 of the PLL ASIC 4 operates in either a hold mode, an update mode, a wait mode, an acquisition mode, or a track mode. Note that the hold mode, the update mode, and the wait mode are subsets of the open-loop mode, while the acquisition mode and the track mode are subsets of the close-loop mode.

In addition to the above mentioned operating modes, an initial power-on mode occurs when power is applied to the PLL ASIC 4, that is, when a pulse is applied to the RESET command, input 4Q of the PLL ASIC 4 and input 12F of the state machine 12. At power-on, the outputs of the PLL ASIC 4 are set to a known state. This state is all zeroes except for the control word which is applied to the D/A register 21. The D/A register 21 is instead set to a start-up value of 0111 1111 1111. Thus, the D/A converter 9 which receives its input from the D/A register 21 sets the OCXO 10 control voltage to a mid-range value.

Figure 4A:
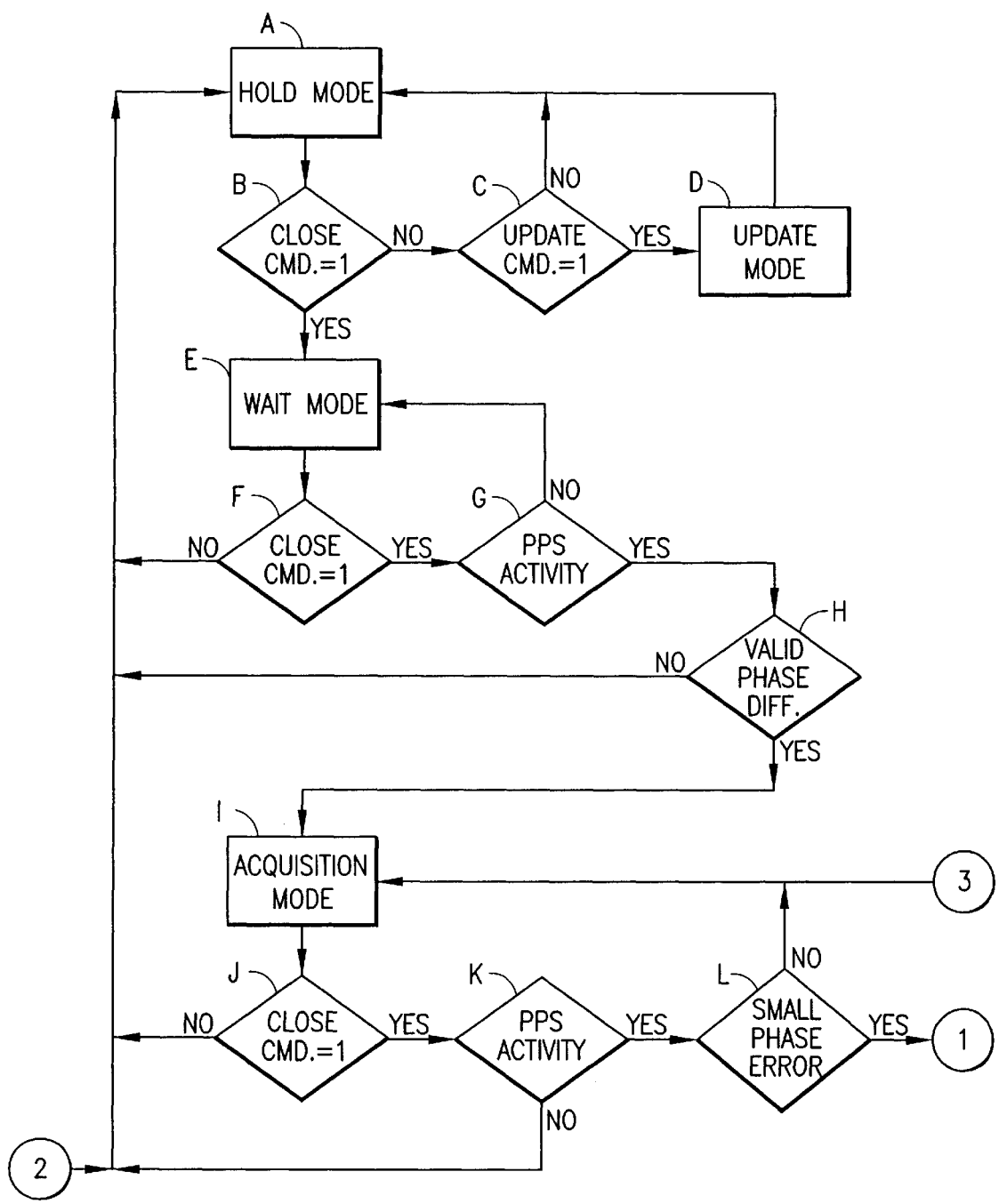
FIGS. 4A and 4B are state flow diagrams, according to the invention, of the PLL ASIC modes of operation.

After the power-on mode, the state machine 12 controls PLL ASIC 4 operation as follows. Referring to FIG. 4A, the hold mode is entered, at Block A, when the PLL ASIC 4 is commanded by the ground station to operate in the open-loop mode. As discussed above, an open-loop command is received by the state machine 12 at the CLOSE command, input 12E. In the hold mode the state machine 12 operates to disable the LOOP CLOCKS, outputs 12G and 12I; set the LOCK TLMY signal, output 12J, to a value of zero (i.e. not locked); and set the TRACK or CLOSED/OPEN-LOOP TLMY signal, output 12K, to a value of zero (i.e. open-loop mode). The state machine 12 then clears the phase detector 15 (register A) and disables the GPS reference signal to register A. The state machine 12 next issues a single LOOP CLOCK, output 12I, to update the D/A register 21. Once the LOOP CLOCK is issued the state machine 12 monitors both the CLOSE command, input 12E at Block B and the UPDATE command, input 12A at Block C. The state machine 12 maintains this monitoring state of the hold mode until it is instructed, via the UPDATE command or CLOSE command, to enter either the update mode or the wait mode. Thus, if the UPDATE command, input 12A, is set to a value of one by the manual frequency control 18 and the CLOSE command, input 12E, remains a value of zero, then the update mode is entered at Block D. However, if the CLOSE command is set to a value of one by the OBPE 7, then regardless of the UPDATE command's status the wait mode is entered at Block E. Note, in the preferred embodiment, the state machine 12 maintains the wait mode until the phase error and/or stability of the GPS reference signals is less than or equal to, for example, ±1.65 µs per second.

In the update mode, as shown in Block D, the control word stored in the D/A register 21 is either incremented or decremented by the state machine 12. The state machine 12 accomplishes the incrementing or decrementing function by generating one pulse of the LOOP CLOCK to the PLL loop filter 19 and the D/A register 21. The state machine 12 invokes either the incrementing or decrementing function when it receives the UPDATE command from the manual frequency control 18. To increment the value in the D/A register 21, the manual frequency control 18 sends the OCXO UP signal to the integrator path of the PLL loop filter 19. The PLL loop filter 19, upon receipt of the OCXO UP signal, passes a +32 signal to accumulator 24 whose output is divided by 32 by the shifter 25, thus incrementing the value of the D/A register 21 by one. Similarly, to decrement the value in the D/A register, the manual frequency control 18 sends the OCXO DOWN signal to the integrator path of the PLL loop filter 19. In response to the OCXO DOWN signal, the PLL loop filter 19 passes a −32 signal to the accumulator 24, which is divided by 32 by the shifter 25, thus decrementing the value in the D/A register 21 by one. Once the D/A register 21 is incremented or decremented, the state machine 12 returns its operation to the hold mode, Block A, where the UPDATE command and CLOSE command are again evaluated to determine its next operating mode, i.e. the state machine 12 returns to the monitoring state of the hold mode.

In the wait mode, as shown in Blocks E through H, the state machine 12 tests for valid GPS reference signals. This ensures that the PLL ASIC 4 does not try to start the acquisition process before the GPS receivers 6 have properly locked to the GPS reference signals, thus providing stable timing signals to the PLL ASIC 4. The wait mode also "jump-starts" the acquisition process by presetting the initial phase alignment of the internal one PPS signal relative to the selected GPS reference signal. The jump-start yields an initial phase error near zero and thus minimizes both the magnitude of the loop transients and the acquisition time.

In operation at Block E, the state machine 12 waits for a first GPS reference signal. When this first signal is detected, the state machine 12 reads and stores a first digital word residing in the phase detector 15. The state machine waits for a second GPS reference signal. The state machine 12 waits a pre-defined period of time for this second signal, for example, about 2 seconds. If the second GPS reference signal is detected within the pre-defined period of time, the state machine 12 reads and stores a second digital word residing in the phase detector 15. When the first and the second digital words have been read and stored, the state machine 12 compares the phase of the first and the second digital words.

At Block H, the state machine 12 evaluates the result of the phase comparison. If the phase difference between the two digital words is greater than a specified threshold, for example, about ±32 counts (approximately 1.7 μsec), then the state machine 12 enters the hold mode. However, if the phase difference between the first and the second digital words is within the specified threshold, the state machine 12 next evaluates the OVERRANGE signal, input 12H. If the OVERRANGE is set, then the state machine 12 resets the 20 bit down counter 13 and the 11 bit counter 14 by issuing the SYNC signal, output 12M, before entering the acquisition mode. The SYNC signal resets the 20 bit down counter 13 and the 11 bit counter 14 to their initial settings. If, however, the OVERRANGE is not set the state machine 12 sets the TRACK signal, output 12K, to a value of one which indicates the PLL ASIC 4 is entering the closed-loop operation. Once the TRACK signal is updated the state machine 12 enters the acquisition mode at Block I. Note, if the state machine 12 detects, at anytime during the wait mode, a value of zero at the CLOSE command, input 12E evaluated at Block F, or if the pre-defined period of time expires before the state machine 12 detects the second GPS reference signal, verified at Block G, then operation of the state machine 12 returns to the hold mode at Block A.

The acquisition mode, as shown in Block I, is the first state of the closed-loop operation. It is entered after a valid GPS pulse phase difference is determined, i.e. the phase difference between the first and the second digital words is within the specified threshold. Within the acquisition mode, the OCXO's 10 phase and frequency is synchronized to that of the selected GPS reference signal. In other words, a new phase difference is measured by the phase detector 15, which is the phase difference between the selected GPS reference signal and the internal one PPS signal derived from the OCXO 10. In the closed-loop mode the new phase difference is gradually reduced to approximately zero.

In the acquisition mode, the state machine 12 sets the LOCK TLMY signal, output 12J, to a value of zero, and enables the LOOP CLOCK, output 12I, to pulse once every 64 seconds. Once the LOOP CLOCK is enabled the state machine 12 evaluates both the CLOSE command, input 12E at Block J, and the REF 1 PPS signal, input 12G at Block K. If the CLOSE command is a value of zero, then the open-loop command has been received and the state machine 12 reenters hold mode at Block A. If the selected GPS reference signal is not received at the REF 1 PPS input within a specified threshold, for example, about 2 seconds, the state machine 12 reenters hold mode at Block A. This later situation would indicate that a missing or erratic GPS reference signal has been experienced.

Additionally, the state machine 12 monitors the OVER-RANGE signal, input 12H. If an overrange condition is detected, then the state machine 12 resets the 20 bit down counter 13 and the 11 bit counter 14 by issuing the SYNC command, output 12M. The state machine 12 also evaluates the phase error between the internal one PPS signal and the selected GPS reference signal. The state machine 12 receives the phase error at the A signal, input 12B, from the phase detector 15. If the state machine determines that the phase error is within a specified threshold, for example, about ±40 counts for 960 seconds, then the state machine 12 enters the track mode at Block M.

Figure 4B:
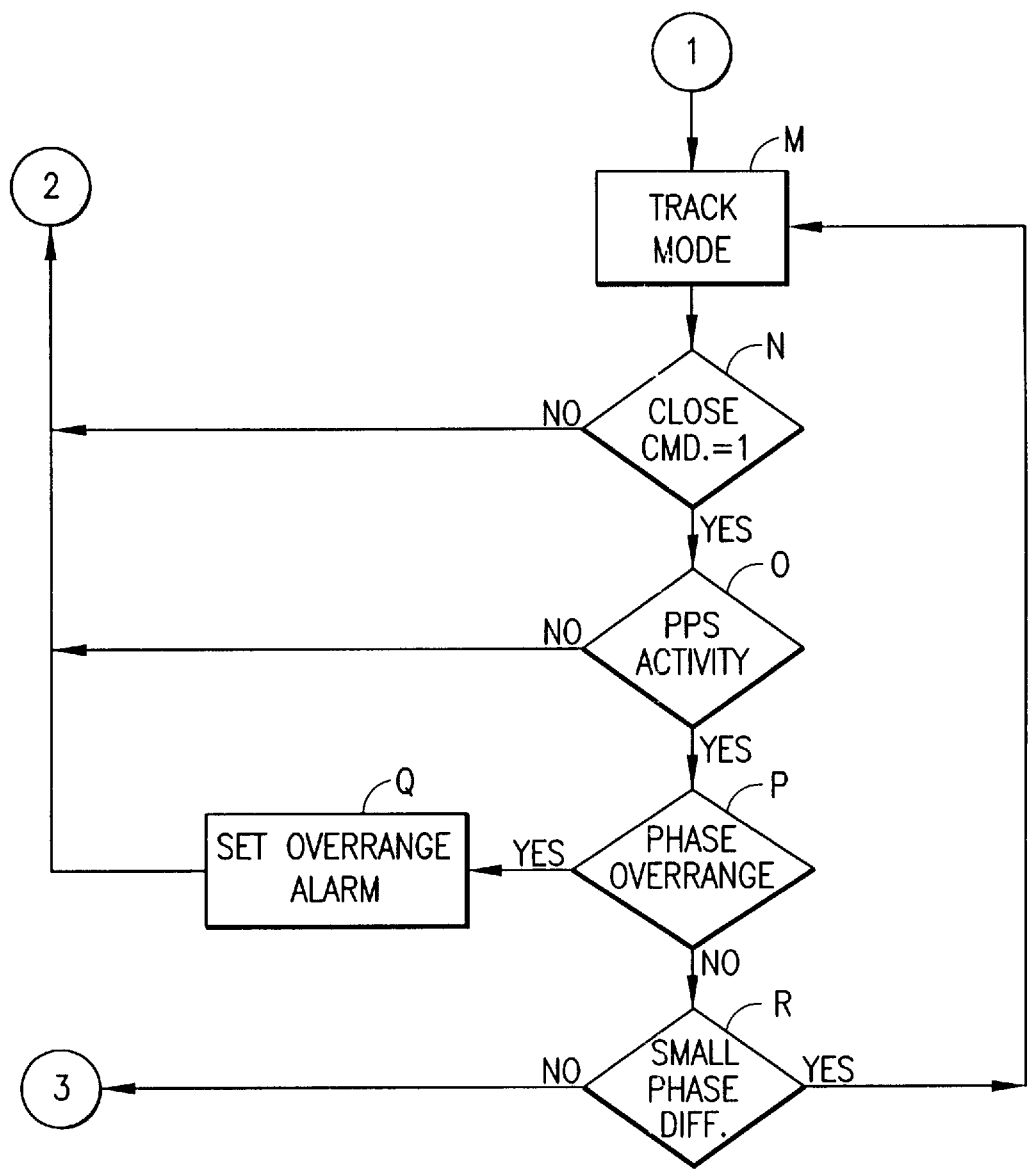

In the track mode, shown at Blocks M through R on FIG. 4B, the state machine 12 sets the LOCK TLMY signal, output 12J, to a value of one which indicates that the OCXO's 10 frequency is phase locked to the GPS reference signals. As in the acquisition mode, the state machine 12 evaluates the CLOSE command, input 12E at Block N, the REF 1 PPS signal, input 12G at Block 0, and the OVER-RANGE signal, input 12H at Block P. If the CLOSE command indicates the open-loop command was issued, or the REF 1 PPS signal indicates that the GPS timing signal is missing or erratic, then the state machine 12 terminates the track mode and reenters the hold mode at Block A. If an OVERRANGE signal is received, the state machine 12 first sets the ALARM TLMY signal, output 12L at Block Q, which indicates that an overrange has occurred, and then reenters the hold mode at Block A. The state machine 12 also monitors the phase error, input 12B at Block R, received from the phase detector 15. If the state machine 12 determines that the phase error is within a specified threshold, for example, about ±40 counts, then the track mode is maintained. However, if the phase difference exceeds the specified threshold, the state machine 12 returns to the acquisition mode in order to reacquire signal synchronization.

Thus, by cycling through the above mentioned states the state machine 12 controls satellite synchronization to the GPS 2 timing pulses.

Figure 5A:
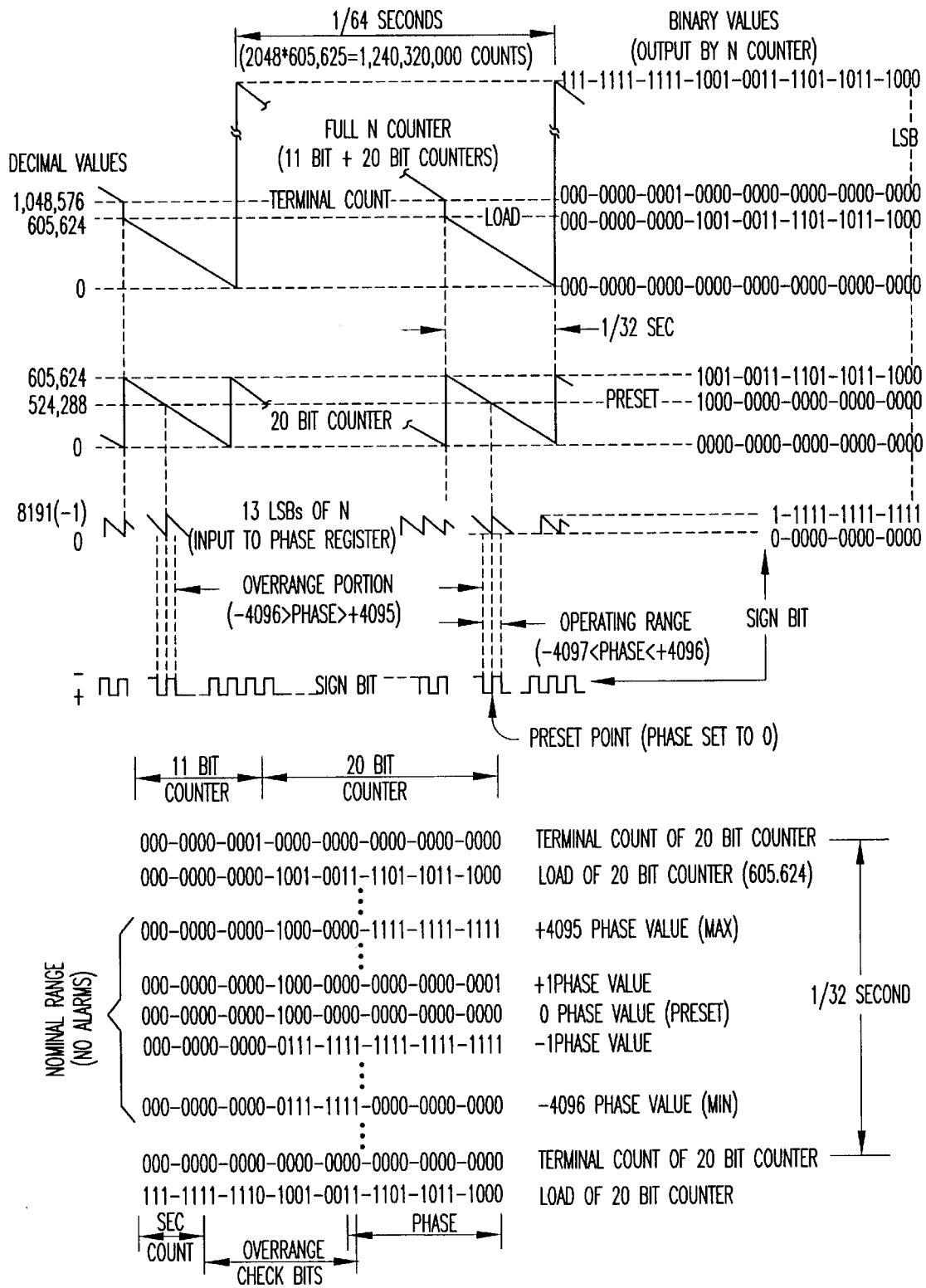
FIG. 5A is a diagram, according to the invention, for an N-Word Counter.

According to the embodiments of this invention, and referring to FIG. 5A, a N-word counter diagram is shown. The N-word counter is the collective output of the 20 bit down counter 13 and the 11 bit counter 14 discussed above. Specific values calculated by the N-word counter are evaluated by the overrange detector 16 in order to detect phase errors that exceed a specified maximum value. If the N-word value exceeds the specified maximum the state machine 12 activates the overrange alarm. The overrange alarm condition is detected before the erroneous phase measurement is used in the next computation. The overrange alarm indicates that either an excessively large phase error or an anomaly, such as a SEU, has occurred.

The state machine 12 takes immediate action to rectify the alarm condition. Once detected, the state machine 12 immediately reenters the hold mode. By reentering hold mode the state machine 12 zeroes the last measured phase error, allows one more loop computation using this zero phase error, and freezes the entire loop. Specifically, the accumulator 24 and the D/A output control word, at output 4F, are frozen at their last valid values. The state machine 12 then attempts to reenter the acquisition mode. As always, the state machine 12 first enters the wait state in which the state machine looks for GPS reference signal activity and then validates the accuracy of the GPS reference signal period. After the GPS reference signal is verified, the state machine 12 examines the absolute magnitude of the phase error. If there is a large phase error, for example an error greater than about ±200 μs, the 20 bit down counter 13 and the 11 bit counter 14, i.e. the N-word counter, are reset using the rising edge on the next GPS reference signal. Using the timing of the GPS reference signal, in effect, sets the phase error to zero. That is, the N-word counter output is now zero, precisely when the GPS reference signal occurs. Thus, the PLL ASIC 4 enters the acquisition mode with the loop numerical values virtually the same as before the anomalous alarm condition. Therefore, many of the GPS receiver timing errors are filtered out and the reactivation time is minimized. This, in effect, "jump-starts" the PLL ASIC's 4 acquisition process by using the previous setting and thus enables gracefully recovery from the abnormality which triggered the overrange alarm.

In essence, the purpose of the N-word counter is to produce a phase waveform that represents the instantaneous phase of the internal one PPS signal derived from the OCXO's 10 19.38 MHz output. FIG. 5A provides a detailed diagram of the N-word counter's operations. When the GPS reference signal is received it latches the instantaneous phase word from the N-word counter into a phase register, register A. This latched word represents the phase of the PLL ASIC's 4 internal one PPS signal relative to the rising edge of the selected GPS reference signal, in other words, the latched word represents the phase error. Thus, the N-word counter is an integrator of the OCXO's 10 frequency where the integral of frequency is instantaneous phase. Because the OCXO's 10 frequency is constant, the N-word counter output is a linear ramp which rolls over every 360 degrees.

All the PLL loop filter's 19 computations are performed in two's complement arithmetic. FIG. 5A shows how the N-word counter is preset so that the phase word output properly represents a two's complement number for phase errors above and below the preset value. Note that the lower 13 LSBs of the N-word counter are preset to a value of 0-0000-0000-0000. If the GPS clock latches the instantaneous phase one 19.38 MHz clock period too soon, then the phase word is latched to a value of 0-0000-0000-0001, i.e. a $\pm 18.6 \times 10^{-6}$ degrees error. If the GPS clock latches the instantaneous phase one clock period too late, then the phase word is latched to a value of 1-1111-1111-1111, or a value of 1FFF in hexadecimal notation. The 1FFF hexadecimal value is the two's complement format of a minus one.

Because the loop requires a negative feedback, the N-word counter is preferably implemented, in part, with a down counter 13. Thus, if the OCXO's 10 frequency is too high, then the down counter 13 operates to result in a negative signed value as the output of the phase detector 15. By implementing the N-word counter, in part, with the down counter 13 there is no need for a two's complement circuit after the phase detector 15, thus minimizing the PLL ASIC's 4 current consumption.

As discussed above, the OCXO's 10 frequency is updated once every 64 seconds. Thus, a 1/64 Hz loop clock is required. The 11 bit counter 14 provides the 1/64 Hz loop clock. In FIG. 5A, the "seconds count" label shows the 1/64 Hz clock as an N-word counter output.

The GPS reference signal is a 1 Hz clock, so the OCXO's 10 clock must be divided to produce a local 1 Hz signal. Once the OCXO's 10 clock is converted to the local 1 Hz signal it is sent to the phase detector 15 for comparison to the GPS reference signal. The conversion of the OCXO's clock may be implemented by using a 25 bit counter. Because the loop filter 19 contains an integrator, the 25 bit word would need to be expanded. However, a word of this size would significantly increase the complexity of the loop's arithmetic computations. Additionally, such a word may potentially introduce a large phase error. With the limited adjustment range available to the OCXO 10, it would take days to remove a large phase error in order to lock the PLL ASIC 4 to the GPS reference signal. Thus, the potentially large phase error is eliminated by sending only the 13 LSBs of the N-word counter to the phase detector 15.

Since the phase error word has been reduced to 13 bits, the maximum measured phase error is now limited to ±0.076 degrees and the PLL could lock to any one of over 2000 different phase positions, only one of which would have a true phase error of zero degrees. The preferred embodiment of the present invention therefore employs an overrange detector 16 within the PLL ASIC 4. The overrange detector 16 detects incorrect phases of the N-word counter relative to the GPS reference and presets, or "jump-starts", the N-word counter. The jump-start sets the N-word counter to an initial phase error of zero by using the rising edge of the next GPS reference signal to parallel load the N-word counter, that is, the 11 bit counter 14 and the 20 bit down counter 13 with the values of 000-0000-0000 and 1000-0000-0000-0000-0000, respectively. The parallel load synchronizes the N-word counter phase relative to the GPS reference PPS timing to the correct ±0.076 degree position.

Figure 5B:
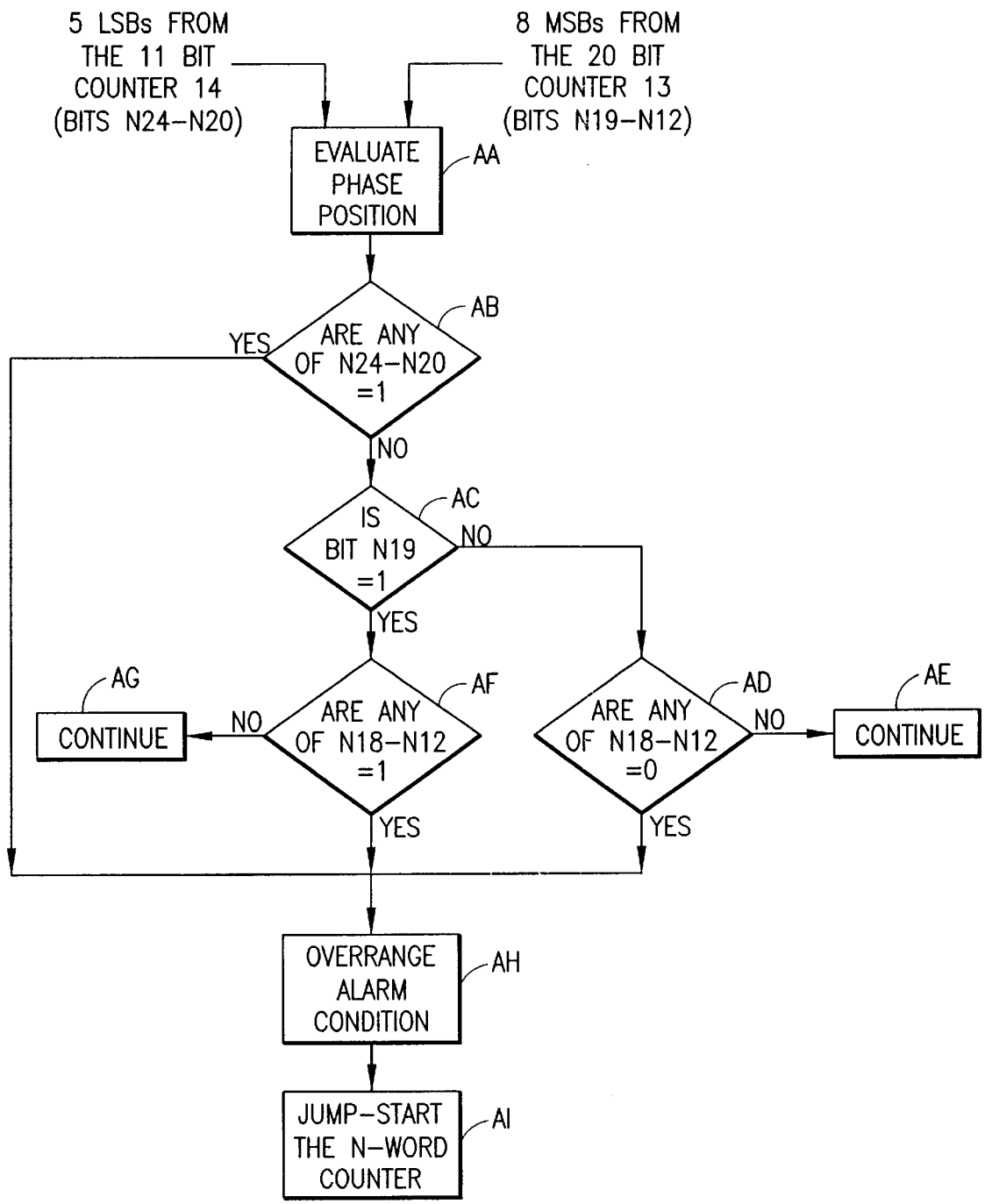
FIG. 5B is a logic flow diagram, according to the present invention, for the operation of the overrange detector.

FIG. 5B outlines a logic flow of the operation of the overrange detector 16. First, at Block AA, the overrange detector 16 receives the 13 bits from the N-word counter. These 13 bits are defined as the 8 MSBs of the 20 bit down counter 13 and the 5 LSBs from the 11 bit counter 14. As shown in Blocks AB through AG and as discussed above, the overrange detector 16 evaluates the value of each of the 13 bits of the N-word. The evaluation is performed in order to determine whether an incorrect phase error position exists within the N-word. At Block AB, the 5 LSBs of the 11 bit counter 14 are evaluated. If one of these bits is set to a value of one then an incorrect phase error exists and the logic immediately passes to Block AH where the overrange detector 16 notifies the state machine 12 of the error and thus sets the overrange alarm. However, if these 5 LSBs are not a value of one, control passes to Block AC where the 8 MSBs of the 20 bit down counter are evaluated. The overrange detector 16 first looks at the MSB of the 20 bit down counter 13, i.e. bit N19. If the N19 bit is set, i.e. N19 is a value of one, then at Block AF, the next 7 bits of the 20 bit down counter 13, N18-N12, are evaluated. If any of these bits are set then an incorrect phase error is again detected and control is passed to Blocks AH where the alarm is set. If all of bits N18-N12 are not set then control passes to Block AG where the counting process continues.

Alternatively, if the evaluation at Block AC finds that the N19 bit was not set, i.e. it is a value of zero, then control is passed to Block AD. At Block AD, the next 7 bits of the 20 bit down counter 13, N18-N12, are evaluated. If any of bits N18-N12 are a value of zero then, once again an incorrect phase error exists and the logic immediately passes control to Block AH. However, if none of bits N18-N12 are zero then control is passed to Block AE and the counting process continues as before.

As indicated above, control is passed to Block AH when an incorrect phase error is detected by the overrange detector 16. The overrange detector 16 sets the overrange alarm by notifying the state machine 12, at Block AH, of the error condition. Also, at Block AI, the state machine 12 initiates the parallel loading of the N-word counter, i.e. the 20 bit down counter 13 and the 11 bit counter 14, to the predefined value discussed above. Thus, by continuously monitoring the N-word counter values the overrange detector 16, and ultimately the state machine 12, minimizes the possibility that the PLL ASIC 4 would lock to a random phase error position. By reducing the possibility of locking to a random phase error position, the state machine 12 minimizes the time period needed for the PLL ASIC's 4 to acquire and to synchronizes itself to the GPS reference signal, i.e. the state machine 12 minimizes the PLL ASIC's 4 acquisition time.

While the invention has been particularly shown and described with respect to preferred embodiments thereof, it will be understood by those skilled in the art that changes in form and details may be made therein without departing from the scope and spirit of the invention.

What is claimed is:

1. A method for synchronizing an earth orbit satellite to a Global Positioning System (GPS), comprising the steps of:

receiving a reference timing pulse from the GPS;

phase locking a reference oscillator of the satellite to the received GPS reference timing pulse; and continuously and automatically correcting the phase and frequency of the reference oscillator in order to maintain synchronization between the satellite and the GPS;

wherein the step of continuously and automatically correcting the reference oscillator is selectively modified based on commands from a terrestrial control system so as to employ at least one of a value stored on the satellite or a value transmitted from the terrestrial control system.

2. A method as in claim 1, wherein the step of phase locking the satellite's reference oscillator to the received GPS timing pulses is achieved with a second-order digital phase-locked loop.

3. A method as in claim 2, wherein the step of phase locking with the second-order digital phase-locked loop is implemented as a phase-locked loop application specific integrated circuit (PLL ASIC).

4. A method as in claim 1, wherein the value stored on the satellite is comprised of a phase difference between the received GPS reference timing pulse and an internal timing pulse derived from an output of the reference oscillator, the phase difference being filtered to provide a control voltage adjustment signal, the adjustment signal being produced continuously for reducing the phase difference between the received GPS reference timing pulse and the internal timing pulse to zero.

5. A method as in claim 4, wherein the internal timing pulse is derived by counting down a clock signal that is output by the reference oscillator.

6. A method as in claim 5, wherein the clock signal is derived from a 19.38 MHz clock.

7. A method as in claim 1, wherein the step of continuously and automatically correcting the reference oscillator occurs during one of a closed-loop operating mode or an open-loop operating mode.

8. A method as in claim 7, wherein in the closed-loop mode the value stored on the satellite is comprised of a phase difference measured between the received GPS reference timing pulses and internal timing pulses derived from an output of the reference oscillator.

9. A method as in claim 7, wherein in the open-loop mode the value stored on the satellite is based on previously received GPS reference timing pulses.

10. A method as in claim 7, wherein in the open-loop mode the value transmitted from the terrestrial control system is comprised of control pulses from a ground station which directly increment or decrement control voltage adjustments that are sent to the reference oscillator.

11. A method as in claim 7, wherein the open-loop operating mode comprises the steps of:

validating the received GPS reference timing pulses by continuously calculating a phase difference between consecutively received GPS reference timing pulses, the validation continues until the phase difference between consecutively received GPS pulses is within a first predetermined phase difference threshold or an overrange alarm is set, if the phase difference between consecutively received GPS pulses is within the first predetermined threshold the closed-loop mode is entered; and wherein if the phase difference between consecutively received GPS pulses is not within the first predetermined threshold, enabling the incrementing or decrementing of the frequency of the reference oscillator by the value transmitted from the terrestrial control system which is comprised of commands received from a ground station, otherwise locking the reference oscillator's frequency to the value stored on the satellite which is comprised of a previously stored value based upon valid GPS reference timing pulses until valid GPS timing pulses are again received.

12. A method as in claim 11, wherein the first predetermined phase difference threshold is ±32 counts of a counter that is operated from the reference oscillator's output frequency.

13. A method as in claim 12, wherein a second predetermined phase difference value triggers the alarm and resets the counter.

14. A method as in claim 11, wherein prior to entering the closed-loop mode, an initial phase alignment is preset to yield an initial phase error, as measured between the internal timing pulse and the GPS reference timing pulse, that is near zero.

15. A method as in claim 7, wherein the closed-loop operating mode further comprises the steps of:

enabling internal timing pulses, and continuously calculating a phase difference between the internal timing pulses and the received GPS reference timing pulses; and controlling the reference oscillator's phase and frequency by converting the phase difference into a control voltage adjustment signal until the phase difference between the internal timing pulses and the received GPS reference timing pulses is within a third predetermined phase difference threshold for a predetermined period of time;

wherein if the phase difference between the internal timing pulses and the received GPS reference timing pulses is within the third predetermined threshold for the predetermined period of time, setting a telemetry signal to indicate that a lock state has been achieved;

wherein if the phase difference between the internal timing pulses and the received GPS reference timing pulses is not within the third predetermined threshold for the predetermined period of time, continuing the reference oscillator's phase and frequency adjustments until an overrange alarm is set or GPS pulses are missing;

wherein if the overrange alarm is set or the GPS pulses are missing for a second predetermined period of time, entering the open-loop mode.

16. A method as in claim 15, wherein the third predetermined phase difference threshold is plus or minus some predetermined number of counts of a counter that counts the reference oscillator's output frequency, wherein the plus or minus some predetermined number of counts phase difference is maintained for a predetermined period of time.

17. A satellite synchronization system, comprising:

a reference oscillator located on board a satellite;

a receiver for receiving GPS reference timing pulses, said receiver coupled to said reference oscillator;

means in said satellite for synchronizing said reference oscillator to said received GPS reference timing pulses; and means in said satellite for continuously and automatically correcting the phase and frequency of said reference oscillator in order to maintain synchronization between said satellite and said GPS, wherein in response to commands from a terrestrial control system said means for correcting selectively employ at least one of a value stored on the satellite or a value transmitted from said terrestrial control system.

18. A system as in claim 17, wherein said reference oscillator is an oven controlled crystal oscillator (OCXO).

19. A system as in claim 17, wherein said receiver for receiving GPS reference timing pulses further comprises at least two redundant receivers, said redundant receivers each receiving a GPS timing pulse, and means for selecting one of said redundant receivers to supply a GPS reference timing pulse.

20. A system as in claim 19, wherein said means for selecting one of said redundant GPS timing pulse receivers comprises select circuitry, said select circuitry being responsive to commands from said terrestrial control system for passing a selected GPS reference timing pulse to said means for synchronizing said reference oscillator.

21. A system as in claim 17, wherein said synchronizing means is comprised of a second order digital phase-locked loop.

22. A system as in claim 21, wherein said second order digital phase-locked loop is implemented as a phase-locked loop application specific integrated circuit (PLL ASIC).

23. A system as in claim 17, wherein said means for synchronizing said reference oscillator further comprises:

a state machine which controls entry into various operating modes;

a frequency control which accepts commands from said terrestrial control system and forwards said commands to said state machine, said commands revising said operating modes;

a PLL loop filter which receives as input an output of said correcting means and said commands from said frequency control, and in response to said operating modes established by said state machine, digitally filters either said output of said correcting means or said commands from said frequency control to produce a digital control signal;

a limiter which receives said digital control signal from said PLL loop filter and limits a peak amplitude of said digital control signal to a value between a specified maximum and minimum; and a D/A converter which receives said digital control signal output of said limiter and generates an analog control signal for said reference oscillator.

24. A system as in claim 23, wherein said GPS timing pulses are monitored for anomalous conditions, and when said anomalous conditions are detected, said synchronizing of said reference oscillator is performed with said value stored on said satellite, wherein said value is comprised of a previously stored value based upon valid GPS reference timing pulses until said anomalous conditions end.

25. A system as in claim 23, wherein said PLL loop filter further comprises an integration limiter, wherein said integration limiter prevents overflow of said PLL loop filter.

26. A system as in claim 17, wherein said means for correcting the phase and frequency of said reference oscillator further comprises:

a first counter which provides an internal timing pulse derived from said reference oscillator, and a running count of a time between a last internal timing pulse and said reference timing pulse received from said GPS;

a second counter coupled to said first counter;

a phase detector, coupled to said first counter and said receiver, for calculating a phase difference between said internal timing pulse and said received GPS reference timing pulse; and an overrange detector which evaluates an output of both said first counter and said second counter to determine if said phase difference is within predetermined limits.

27. A system as in claim 26, wherein said first counter is a 20 bit synchronous down counter.

28. A system as in claim 26, wherein said second counter is a 11 bit synchronous counter.

29. A satellite synchronization system, comprising:

a reference oscillator on board a satellite;

at least one GPS timing pulse receiver coupled to said reference oscillator;

means in said satellite for synchronizing said reference oscillator to received GPS reference timing pulses;

means in said satellite for continuously and automatically correcting the phase and frequency of said reference oscillator in order to maintain synchronization between said satellite and said GPS; and a manual control which accepts commands from a ground station to override said synchronizing of said reference oscillator to said received GPS reference timing pulses, and instead to enable ground-based commands to control said satellite's reference oscillator.

* * * * *